United States Patent
Rofougaran

(10) Patent No.: US 8,023,886 B2
(45) Date of Patent: Sep. 20, 2011

(54) METHOD AND SYSTEM FOR REPEATER WITH GAIN CONTROL AND ISOLATION VIA POLARIZATION

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 686 days.

(21) Appl. No.: 11/863,928

(22) Filed: Sep. 28, 2007

(65) Prior Publication Data
US 2009/0088069 A1 Apr. 2, 2009

(51) Int. Cl.
*H04B 3/36* (2006.01)

(52) U.S. Cl. ............ 455/7; 455/13.1; 455/11.1; 455/24; 455/67.13; 370/279

(58) Field of Classification Search ............ 455/7, 11.1, 455/16, 575.5, 226.4, 13.3, 423, 428, 12.1, 455/13.4, 513, 552.1, 570, 135, 15, 19, 20; 370/279
See application file for complete search history.

(56) References Cited

U.S. PATENT DOCUMENTS

| | | | |
|---|---|---|---|
| 4,901,307 A | 2/1990 | Gilhousen et al. | |
| 4,979,170 A * | 12/1990 | Gilhousen et al. | 370/321 |
| 5,724,666 A * | 3/1998 | Dent | 455/562.1 |
| 5,937,332 A * | 8/1999 | Karabinis | 455/12.1 |
| 6,032,057 A | 2/2000 | Kiiski | |
| 6,141,539 A | 10/2000 | Marino | |
| 6,201,801 B1 * | 3/2001 | Dent | 370/342 |
| 6,339,611 B1 * | 1/2002 | Antonio et al. | 375/130 |
| 7,577,398 B2 | 8/2009 | Judd et al. | |
| 2002/0012336 A1 | 1/2002 | Hughes et al. | |
| 2004/0110469 A1 * | 6/2004 | Judd et al. | 455/15 |
| 2004/0166802 A1 * | 8/2004 | McKay et al. | 455/15 |
| 2005/0053025 A1 * | 3/2005 | Duffy et al. | 370/315 |
| 2005/0057421 A1 | 3/2005 | Mohamadi | |
| 2006/0014491 A1 * | 1/2006 | Cleveland | 455/17 |
| 2006/0052066 A1 * | 3/2006 | Cleveland et al. | 455/101 |
| 2006/0063484 A1 * | 3/2006 | Proctor et al. | 455/7 |
| 2006/0063485 A1 * | 3/2006 | Gainey et al. | 455/15 |
| 2006/0063487 A1 * | 3/2006 | Cleveland et al. | 455/22 |
| 2006/0205343 A1 * | 9/2006 | Runyon et al. | 455/11.1 |
| 2007/0066220 A1 * | 3/2007 | Proctor et al. | 455/11.1 |
| 2007/0072603 A1 * | 3/2007 | Wang | 455/427 |
| 2007/0155314 A1 | 7/2007 | Mohebbi | |
| 2007/0159991 A1 | 7/2007 | Noonan et al. | |
| 2007/0182635 A1 | 8/2007 | Jeung | |

(Continued)

FOREIGN PATENT DOCUMENTS

KR 19990048907 6/2001

(Continued)

*Primary Examiner* — Tan Trinh
(74) *Attorney, Agent, or Firm* — McAndrews, Held & Malloy, Ltd.

(57) ABSTRACT

A repeater device may be utilized to enable forwarding extreme high frequency (EHF) communication between EHF-enabled wireless devices. The repeater device may utilize polarization isolation to prevent and/or reduce interference between received and transmitted EHF RF signals in the repeater device. The repeater device may utilize signal gain control to maximize the transmit signal strength while forwarding EHF RF signals to enhance and/or enable polarization isolation between received and transmitted EHF RF signals. Received Signal Strength Indicators (RSSI) may be utilize to measure signal strength of transmit and/or received EHF RF signals to enable performing signal gain control. The repeater device may utilize control connections to enable communicating with the EHF-enabled wireless devices to facilitate performing signal gain control at the repeater device. Non-EHF interfaces, for example Bluetooth, may be utilized to establish the control connections.

25 Claims, 4 Drawing Sheets

U.S. PATENT DOCUMENTS

| | | | |
|---|---|---|---|
| 2007/0232228 A1* | 10/2007 | McKay et al. | 455/11.1 |
| 2007/0268846 A1* | 11/2007 | Proctor et al. | 370/279 |
| 2008/0002652 A1* | 1/2008 | Gupta et al. | 370/338 |
| 2008/0002657 A1 | 1/2008 | Pisek et al. | |
| 2008/0081555 A1* | 4/2008 | Kong et al. | 455/11.1 |
| 2008/0136736 A1* | 6/2008 | Proctor et al. | 343/893 |
| 2009/0088071 A1* | 4/2009 | Rofougaran | 455/13.1 |
| 2009/0088072 A1 | 4/2009 | Rofougaran et al. | |
| 2009/0088073 A1 | 4/2009 | Rofougaran et al. | |
| 2009/0088213 A1* | 4/2009 | Rofougaran | 455/562.1 |
| 2009/0098824 A1 | 4/2009 | Rofougaran et al. | |
| 2010/0029197 A1* | 2/2010 | Judd et al. | 455/11.1 |

FOREIGN PATENT DOCUMENTS

KR 20060099210 9/2006

* cited by examiner

METHOD AND SYSTEM FOR REPEATER WITH GAIN CONTROL AND ISOLATION VIA POLARIZATION

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to wireless communication. More specifically, certain embodiments of the invention relate to a method and system for a repeater with gain control and isolation via polarization.

BACKGROUND OF THE INVENTION

In 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications.' With respect to accessibility of this designated portion of the spectrum, 60 GHz communications is similar to other forms of unlicensed spectrum use, for example Wireless LANs (WLAN) or Bluetooth in the 2.4 GHz ISM bands. However, communications at 60 GHz may be significantly different in aspects other than accessibility. For example, 60 GHz signals may provide markedly different communications channel and propagation characteristics, at least due to the fact that 60 GHz radiation is partly absorbed by oxygen in the air, leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a repeater with gain control and isolation via polarization, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a repeater with gain control and isolation via polarization. A repeater device may be utilized to enable forwarding extreme high frequency (EHF) communication between EHF-enabled wireless devices. The repeater device may utilize polarization isolation to prevent and/or reduce interference between received and transmitted EHF RF signals in the repeater device. The repeater device may utilize signal gain control to maximize the transmit signal strength while forwarding EHF RF signals to enhance and/or enable polarization isolation between received and transmitted EHF RF signals. Received Signal Strength Indicators (RSSI) may be utilized to measure signal strength of transmit and/or received EHF RF signals to enable performing signal gain control. The repeater device may utilize control connections to enable communicating with the EHF-enabled wireless devices to facilitate performing signal gain control at the repeater device. Non-EHF interfaces, for example Bluetooth, may be utilized to establish the control connections.

Figure 1:
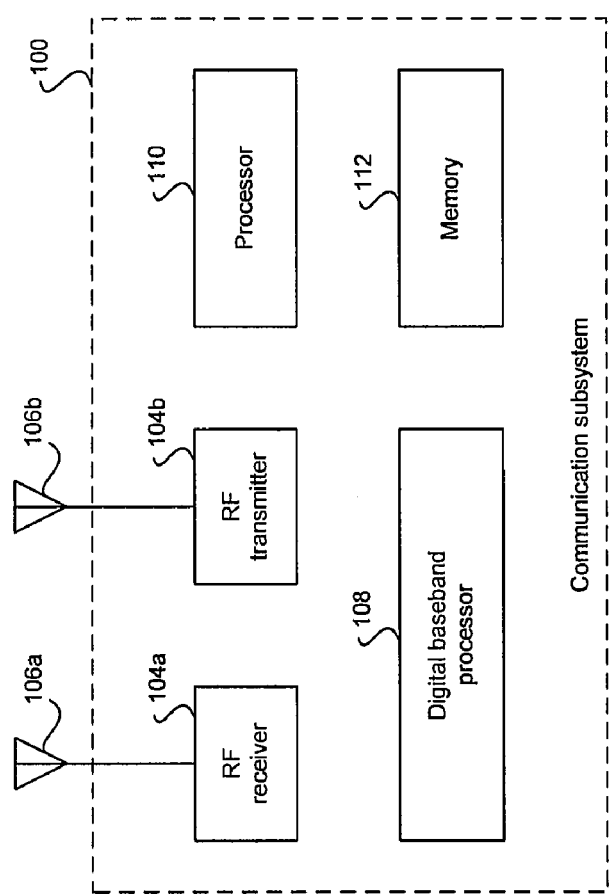
FIG. 1 is a block diagram illustrating an exemplary communication subsystem, which may be utilized in connection with an embodiment of the invention.

FIG. 1 is a block diagram illustrating an exemplary communication subsystem, which may be utilized in accordance with an embodiment of the invention. Referring to FIG. 1, there is shown a communication subsystem 102, an RF receiver 104a, an RF transmitter 104b, a receive antenna 106a, a transmit antenna 106b, a digital baseband processor 108, a processor 110, and a memory 112.

The communication subsystem 102 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 102 may be integrated or located within a wireless device to enable operations in a wireless system, such as the cellular network and/or digital video broadcast network.

The receive antenna 106a may comprise suitable logic, circuitry, and/or code that may enable reception of RF signals; receive antenna 106a may be communicatively coupled to the RF receiver 104a. The RF receiver 104a may comprise suitable logic, circuitry, and/or code that may enable processing of received RF signals. The RF receiver 104a may enable receiving extremely high frequency (EHF) signals at, for example, approximately 60 GHz or greater. In this regard, the RF receiver 104a may be enabled to generate signals, such as local oscillator signals, for the reception and processing of EHF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal components before transferring the components to the digital baseband processor 108. In other instances, the RF receiver 104a may transfer the baseband signal components in analog form. The receive antenna 106a and the RF receiver 104a may also enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals; the transmit antenna 106b may be communicatively coupled to the RF transmitter 104b. The RF transmitter 104b may comprise suitable logic, circuitry, and/or code that may enable processing of RF signals for transmission. The RF transmitter 104b may enable transmission of extremely high frequency (EHF) signals at, for example, approximately 60 GHz or greater. In this regard, the RF transmitter 104b may be enabled to generate signals, such as local oscillator signals, for the transmission and processing of EHF signals. The RF transmitter 104b may up-convert the baseband frequency signal to an RF signals. The RF transmitter 104b may perform direct up-conversion of the baseband frequency signal to a RF signal of approximately 60 GHz, for example. In some instances, the RF transmitter 104b may enable digital-to-analog conversion of the baseband signal components received from the digital baseband processor 108 before up conversion. In other instances, the RF transmitter 104b may receive baseband signal components in analog form. The transmit antenna 106b and the RF transmitter 104b may also enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. The digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RF transmitter 104b for transmission to the network.

The processor 110 may comprise suitable logic, circuitry, and/or code that may enable control and/or data processing operations for the communication subsystem 102. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 102. The processor 110 may also enable executing of applications that may be utilized by the communication subsystem 102. For example, the processor 110 may execute applications that may enable displaying and/or interacting with content received via RF signals in the communication subsystem 102.

The memory 112 may comprise suitable logic, circuitry, and/or code that may enable storage of data and/or other information utilized by the communication subsystem 102. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 102. For example, the memory 112 may comprise information necessary to configure the RF receiver 104a to enable receiving signals in the appropriate frequency band.

In operation, the communication subsystem 102 may enable communication via RF interfaces. The communication subsystem 102 may be integrated within wireless devices to enable communication via an EHF interface, for example the 60 GHz band. For example, the communication subsystem 102 may receive RF signals operating in the 60 GHz band via the receive antenna 106a; wherein the RF receiver 104a may enable initial processing of the received signal. The communication subsystem 102 may transmit RF signals operating in the 60 GHz band via the RF transmitter 104b and the transmit antenna 106b. The digital baseband processor 108, the processor 110, and the memory 112 may enable performing control and/or related operation during transmission and/or reception of RF signals. For example, the memory 112 may be utilized to store and/or fetch data that may be received and/or transmitted via 60 GHz RF signals. The digital 108 may enable performing signal processing operation such as analog-to-digital conversion, encoding/decoding of received and/or transmitted data via the 60 GHz RF signals. The processor 110 may enable controlling of the operations of the communication subsystem 102. For example, the processor 110 may enable operating of the transmit and/or the receive antennas to enable aligning during 60 GHz RF communications.

In addition to EHF communications, which may have limited operational range compared with lower frequency RF interfaces, the communication subsystem 102 may be enabled to utilize other wireless interfaces and/or protocols. For example, the communication subsystem 102 may be enabled to utilize such wireless interfaces as Bluetooth to perform Bluetooth RF communications. Accordingly, the receive antenna 106a, the RF receiver 104a, and/or other components within the communication subsystem 102 may enable reception of non-EHF RF signals, for example, Bluetooth RF signals. Similarly, the transmit antenna 106b, the RF transmitter 104b, and/or other components within the communication subsystem 102 may enable transmission of non-EHF RF signals, for example, Bluetooth RF signals. The non-EHF interfaces that may be supported in the communication subsystem 102 may be utilized to send information regarding the communication subsystem 102. For example, a Bluetooth connection may be utilized to send information regarding the capability of the communication subsystem 102 and/or to receive messages containing information regarding preferred setting that may be utilized while performing EHF communication.

Figure 2:
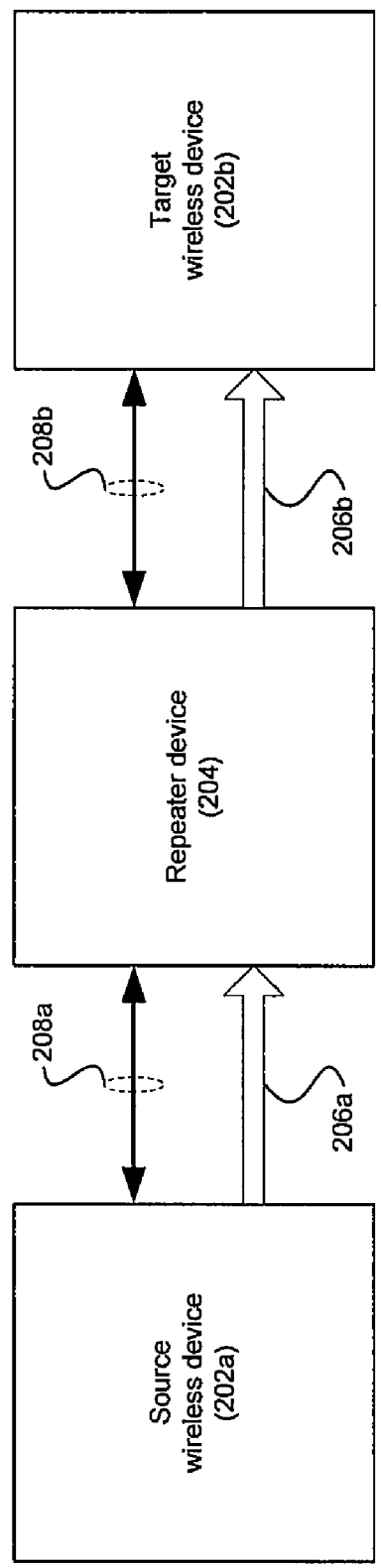
FIG. 2 is a block diagram illustrating a repeater device utilized to forward EHF communication between two wireless devices, which may be utilized in accordance with an embodiment of the invention.

In an embodiment of the invention, repeater devices may be utilized to extend the range of EHF communication between wireless devices that may comprise the communication system 100. EHF communication may generally have limited range, typically operating only in "line-of-sight" settings. Consequently, it may desirable to utilize other devices, for example, repeater devices, to extend the range of communication between EHF-enabled devices. While it may be desirable to utilize repeater devices in forwarding EHF RF signals between EHF-enabled wireless devices, mechanisms that prevent and/or reduce interference between receive and transmit EHF RF signals at such repeater devices may be necessary. For example, polarization isolation may be utilized in repeater devices, wherein polarization of receive and transmit EHF RF signals in the repeater devices may be such that minimal interference may be caused by transmit EHF RF signals to reception of EHF RF signal received in the repeater devices. Additionally, signal gain may be applied to the transmit EHF RF signals, wherein the signal strength of transmit EHF RF signals may be increased to a maximum allowable value that enables maintaining and/or maximizing polarization isolation between the transmit and receive EHF RF signals FIG. 2 is a block diagram illustrating a repeater device utilized to forward EHF communication between two wireless devices, which may be utilized in accordance with an embodiment of the invention. Referring to FIG. 2, there is shown a source wireless device 202a, a target wireless device 202b, a repeater device 204, EHF connections 206a and 206b, and control connections 208a and 208b.

The source wireless device 202a and the target wireless device 202b may each comprise suitable logic, circuitry, and/or code that may enable receiving, transmitting, and processing of RF signals. For example, the source wireless device 202a and the target wireless device 202b may each comprise the communication subsystem 102, substantially as described in FIG. 1.

The repeater device 204 may comprise suitable logic, circuitry, and/or code that may enable reception and/or transmission of EHF signals to facilitate forwarding EHF signals from the source wireless device 202a to the target wireless device 202b. Additionally, the repeater device 204 may comprise suitable logic, circuitry, and/or code that may enable establishing and/or utilizing control connections 208a and 208b with the source wireless device 202a and/or target wireless device 202b, respectively.

The EHF connections 206a and 206b may each comprise a radio (RF) and/or wireless link that may be based on an EHF protocol that may comprise the 60 GHz interface. The control connections 208a and 208b may each comprise a radio (RF) and/or wireless link that may be based on a non-EHF protocol that may comprise Bluetooth, which may be utilized to communicate control messages between the source wireless device 202a and the repeater device 204, and between the repeater device 204 and the target device 202b, respectively.

In operation, the repeater device 204 may enable forwarding EHF RF signals transmitted from the source wireless device 202a via the EHF connection 206a, to the target wireless device 202b via the EHF connection 206b. EHF communication may generally have limited range, typically operating only in "line-of-sight" settings. Consequently, it may desirable to utilize other devices, for example, repeater devices such as the repeater device 204, to extend the range of communication between EHF-enabled devices.

The wireless device 202a may utilize the communication subsystem 102 to enable transmission of EHF RF signals via the EHF connection 206a. The wireless device 202b may utilize the communication subsystem 102 to enable reception of EHF RF signals via the EHF connection 206b. The repeater device 204 may be utilized because EHF RF signals may have limited operational range. The source wireless device 202a, the target wireless device 202b, and/or the repeater device 204 may utilize the control connections 208a and/or 208b during EHF communication between the three devices. The control connections 208a and/or 208b may enable exchanging control messages, data, and/or information that may enable facilitating EHF communication. For example, the control connections 208a and/or 208b may enable the repeater device 204 to receive and/or transmit control messages that may enable the source wireless device 202a to transmit EHF RF signals to the repeater device 204 via the EHF connection 206a, and/or may enable the target wireless device 202b to receive EHF RF signals from the repeater device 204 via the EHF connection 206b.

While it may be desirable to utilize the repeater device 204 in forwarding EHF RF signals between the source wireless device 202a and the target wireless device 202b; mechanisms that prevent and/or reduce interference between receive and transmit EHF RF signals at the repeater device 204 may be necessary. For example, polarization isolation may be utilized in the repeater device 204, wherein polarization of receive and transmit EHF RF signals in the repeater device 204 may be such that minimal interference may be caused by transmit EHF RF signals to reception of EHF RF signal received in the repeater device 204. Additionally, signal gain may be applied to the transmit EHF RF signals, wherein the signal strength of the transmit EHF RF signals may be increase to a maximum allowable values that enable maintaining and/or maximizing polarization isolation between the transmit and receive EHF RF signals in the repeater device 204.

In an exemplary embodiment of the invention, EHF RF transmission may occur utilizing 90 degrees polarization while EHF RF reception may occur utilizing 0 degrees polarization.

Figure 3:
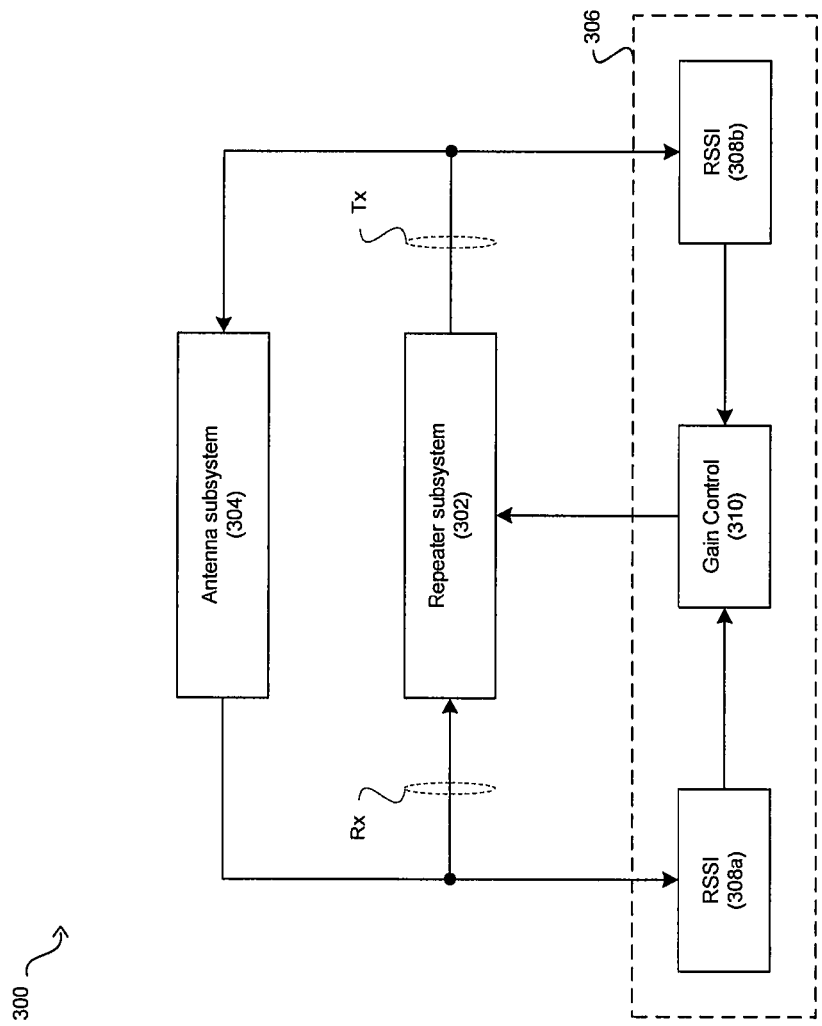
FIG. 3 is a block diagram illustrating a repeater system utilizing signal gain control to maximize transmit signal strength while forwarding EHF communication, in accordance with an embodiment of the invention.

FIG. 3 is a block diagram illustrating a repeater system utilizing signal gain control to maximize transmit signal strength while forwarding EHF communication, in accordance with an embodiment of the invention. Referring to FIG. 3, there is shown a repeater system 300, a repeater subsystem 302, an antenna subsystem 304, a signal gain subsystem 306, received signal strength indicator (RSSI) blocks 308a and 308b, and a gain control block 310.

The repeater system 300 may comprise the repeater subsystem 302, the antenna subsystem 304, the signal gain subsystem 306, and suitable logic, circuitry, and/or code that may enable reception and/or transmission of EHF signals to facilitate forwarding EHF signals. The repeater system 300 may be integrated within a repeater device substantially similar to the repeater device 204 as described in FIG. 2.

The repeater subsystem 302 may comprise suitable logic, circuitry, and/or code that may enable controlling and/or performing signal processing that may be necessary to perform reception and/or transmission of EHF signals via the repeater system 300.

The antenna subsystem 304 may comprise suitable logic, circuitry, and/or code that may enable transmission and/or reception of EHF RF signals. For example, the antenna subsystem 304 may comprise a plurality of antennas that may enable reception and/or reception of EHF RF signals. In an embodiment of the invention, polarization antennas that may enable transmission and/or reception of EHF RF signals comprising different polarizations may be utilized, wherein each of the plurality of antennas within the antenna subsystem 304 may enable minimal polarization mismatch between a received EHF RF signals and the respective antenna during reception of EHF RF signals. Additionally, each of the plurality of antennas within the antenna subsystem 304 may be configured so the EHF RF signals transmitted by each of the antennas may be optimally received by a wireless device. In this regard, receiving antennas at the wireless device may be configured to ensure optimal reception of the EHF RF signals.

The signal gain subsystem 306 may comprise the RSSI blocks 308a and 308b, the gain control block 310, and suitable logic, circuitry, and/or code that may enable performing signal gain control operations in the repeater system 300. The RSSI blocks 308a and 308b may each comprise suitable logic, circuitry, and/or code that may enable measuring the signal strength of the receive and/or transmit EHF RF signals, respectively. The gain control block 310 may comprise suitable logic, circuitry, and/or code that may enable processing RSSI measurement information. For example, the gain control block 310 may be enabled to receive RSSI measurement information obtained via the RSSI blocks 308a and/or 308b. The gain control block 310 may then be enabled to analyze the received RSSI measurement information, and/or to generate and/or send signal strength setting information to the repeater subsystem 302.

In operations, the repeater system 300 may utilize polarization isolation to prevent and/or reduce interference at the repeater system 300 between EHF RF signals received and/or transmitted by the repeater system 300 via the antenna subsystem 304. Isolation may improve performance of the repeater system 300 by preventing and/or reducing signal interference that may be caused to the receive EHF RF signals by the transmit EHF RF signals in the repeater system 300 via leak back. Isolation may be achieved via different mechanism, including polarization isolation. Polarization isolation may comprise setting the polarization of the transmit EHF RF signals and the receive EHF RF signals to enable preventing and/or reducing interference between EHF RF signals received by the repeater system 300 and EHF RF signals transmitted from the repeater system 300, wherein the transmitted and the received EHF RF signals may optimally have 900 differential in polarization.

Polarization isolation may be achieved by utilizing polarization antennas within the plurality of antennas that may be integrated within the antenna subsystem 304. The repeater system 300 may determine, via the control connection 208a, that the source wireless device 202a may transmit EHF RF signals that are optimal, based on polarization, for one of the plurality of antennas within the antenna subsystem 304. Accordingly, the repeater system 300 may utilize the appropriate antenna in the plurality of antennas within the antenna subsystem 304 while receiving EHF RF signals from the source wireless device 202a. Furthermore, the repeater system 300 may determine, via the repeater subsystem 302 and/or control connection 208b, that transmitting EHF RF signals via one of the antennas in the plurality of antennas integrated within the antenna subsystem 304 may enable polarization isolation between the received and transmitted EHF RF signals. Accordingly, the repeater system 300 may utilize the appropriate antenna in the plurality of antennas within the antenna subsystem 304 while receiving transmitting EHF RF signals to the target wireless device 202b.

Additionally, signal gain control may be utilized to enhance and/or achieve polarization isolation via the repeater system 300. The signal strength of the transmit EHF RF signals may be increased to enable, for example, extending the range of the transmit EHF RF signals and/or improve the likelihood of successful reception of EHF RF signals in the target wireless device 202b. However, signal strength increase in the transmit EHF RF signals may, if performed in an uncontrolled manner, adversely affect reception of the received or other transmitted EHF RF signals in the repeater system 300 via the antenna subsystem 304.

Consequently, the signal gain subsystem 304 may be utilized to enable maximizing signal gain of the transmitted EHF RF signals so as to mitigate the effect of interference on other EHF signals that are received and/or transmitted. The RSSI blocks 308a and 308b may be utilized to measure signal strength of the receive EHF RF signals and transmit EHF RF signals, respectively. Signal strength measurement information read via the RSSI blocks 308a and 308b may be fed into the gain control block 310. The gain control block 310 may determine, based on the RSSI measurement information, applicable and/or available signal gain that may be applied and/or incorporated into transmit EHF RF signals. The signal gain determinations made via the gain control block 310 may then be fed into the repeater subsystem 302, wherein signal gain may be applied during signal processing operation pertaining to generation of transmit EHF RF signal, which may be transmitted via the antenna subsystem 304. The signal gain operation may be performed continually during EHF RF signal forwarding in the repeater system 300.

In another embodiment of the invention, the repeater system 300 may enable negotiating and/or modification of transmit and/or receive EHF RF signal during signal gain operations in the repeater system 300. For example, the repeater system 300 may determine, via the signal gain control subsystem 306, an optimal setting for the receive EHF RF signals that may enable improved signal gain setting for the transmit EHF RF signal. Consequently, the repeater system 300 may communicate the determined receive EHF RF signal setting, via the control connection 208a, to the source wireless device 202a, to enable the source wireless device 202a to adjust the receive EHF RF signals accordingly.

In addition to polarization isolation, other types of isolation may be utilized in the repeater system 300. For example, beam forming may be utilized to achieve narrow transmit EHF RF signals and/or receive EHF RF signals in the repeater device 300. Accordingly, signal gain control may be utilized to enhance and/or achieve such isolation via the repeater system 300 substantially as described in regard to use of signal gain control with polarization isolation. Any combination of RSSI, beamforming and/or polarization isolation may be utilized to provide isolation.

Figure 4:
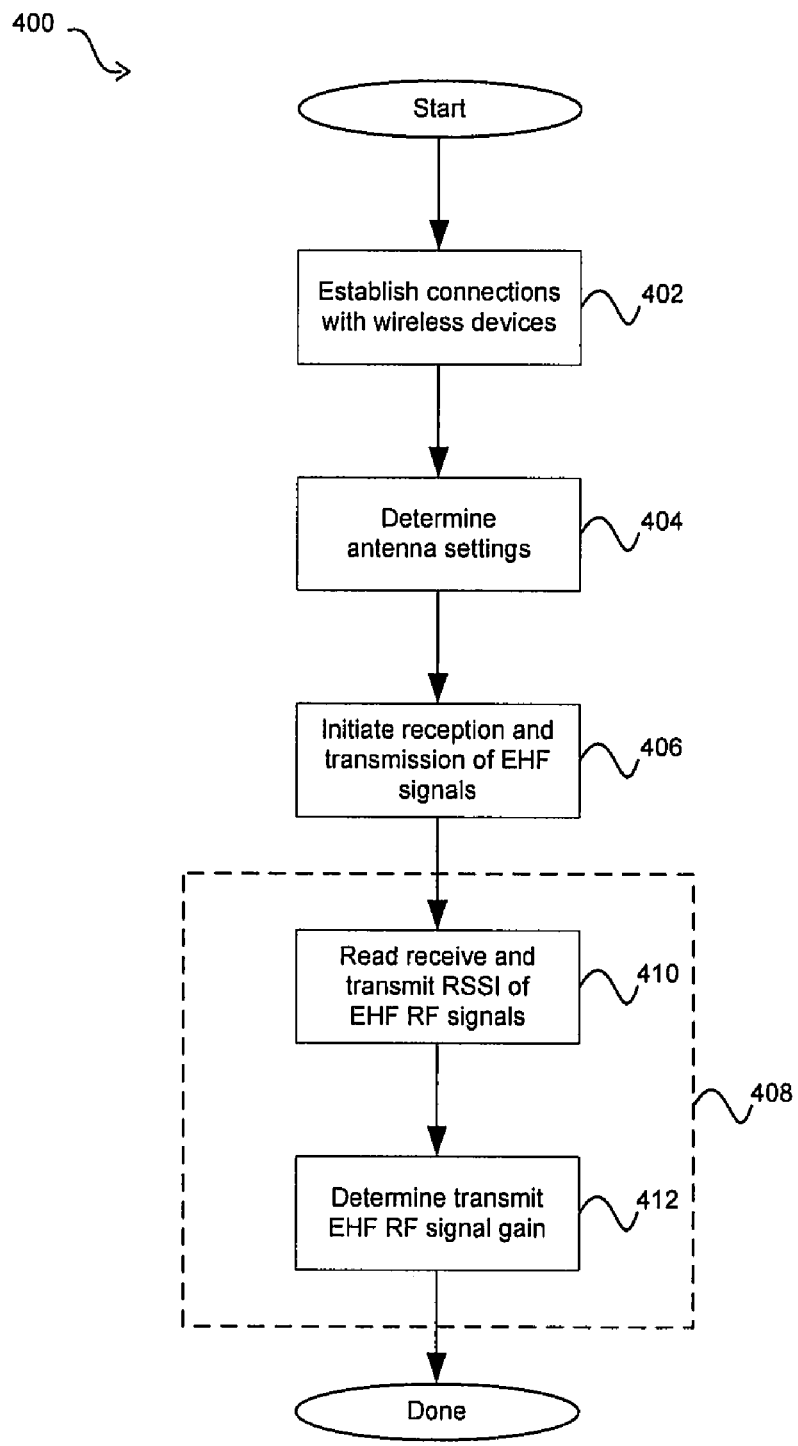
FIG. 4 is an exemplary flow diagram illustrating use of signal gain control with polarization isolation in a repeater device, in accordance with an embodiment of the invention.

FIG. 4 is an exemplary flow diagram illustrating use of signal gain control with polarization isolation in a repeater device, in accordance with an embodiment of the invention. Referring to FIG. 4, there is shown a flow chart 400 comprising a plurality of exemplary steps. In step 402, the repeater device 204 may establish control connections 208a and 208b with the source wireless device 202a and the target wireless device 202b, respectively, to enable interactions among the devices during EHF RF communication. In step 404, antenna settings consistent with polarization isolation may be determined. For example, where the repeater device 204 may comprise the repeater system 300, the antenna subsystem 304 may be configured to enable polarization isolation between EHF RF signals transmitted by the source wireless device 202a, transmit EHF RF signals transmitted to the target wireless device 202b. In step 406, EHF RF communication may be initiated between the repeater 204, and/or wireless devices 202a and/or 202b. For example, once the repeater device 204 may complete antenna setting as determined in step 404, the repeater device 204 may communicate to the wireless devices 202a and/or 202b, via control connections 208a and/or 208b, respectively, that the repeater device 204 may be ready for EHF forwarding operation. Accordingly, the source wireless device 202a may commence transmitting EHF RF signals to the repeater device 204, and/or the target wireless device 202b may initiate EHF RF signals reception operations.

In step 408, which may be continually repeated during EHF RF communication, signal gain control operations may be performed in the repeater device 204. In step 410. The Received Signal Strength Indicator (RSSI) of the transmit and the receive signals may be read. For example, the RSSI blocks 308a and 308b may be utilized to measure signal strength of the receive EHF RF signals and transmit EHF RF signals, respectively. In step 412. The signal gain for the transmit EHF RF signals may be determined. For example, the gain control block 310 may determine, based on the RSSI measurement information read via the RSSI blocks 308a and 308b, applicable and/or available signal gain that may be applied and/or incorporated into transmit EHF RF signals. The signal gain determinations made via the gain control block 310 may then be fed into the repeater subsystem 302, wherein signal gain may be applied during signal processing operation pertaining to generation of transmit EHF RF signals.

Various embodiments of the invention may comprise a method and system for repeater with gain control and isolation via polarization. The repeater device 204 may enable forwarding extreme high frequency (EHF) communication between the source wireless device 202a and the target wireless device 202b. The repeater device 204 may utilize polarization isolation to prevent and/or reduce interference between received and transmitted EHF RF signals in the repeater device 204. Duration EHF forwarding operations, the repeater device 204 may utilize signal gain control to maximize the transmit signal strength while forwarding EHF RF signals to enhance and/or enable polarization isolation between received and transmitted EHF RF signals. The repeater device 204 may utilize repeater system 300 with signal gain subsystem 306 to perform signal gain control operations. The RSSI blocks 308a and 308b may be utilized to measure signal strength of receive and transmit EHF RF signals, respectively. Signal strength measurement information may then be fed into gain control block 310 to determine proper signal gain that may be applied to transmit EHF RF signals. The signal gain settings determined by the gain control block 310 may be inputted into the repeater subsystem 302 to be utilized in signal processing operation pertaining to generation of transmit EHF RF signals that may be transmitted to the target wireless device 202b via the antenna subsystem 304.

Another embodiment of the invention may provide a machine-readable storage, having stored thereon, a computer program having at least one code section executable by a machine, thereby causing the machine to perform the steps as described herein for repeater with gain control and isolation via polarization.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
mitigating via polarization isolation, signal interference between receive (Rx) and transmit (Tx) signals in a repeater device that extends a range of extremely high frequency (EHF) signals communicated between a plurality of wireless devices, wherein said repeater device is operable to manage EHF forwarding via one or more control connections, and at least one of said one or more control connections is established utilizing a second interface that is separate from a first interface utilized for communicating said EHF signals between said plurality of wireless devices; and
maximizing a strength of said transmit (Tx) signals via signal gain control in said repeater device.

2. The method according to claim 1, wherein said extremely high frequency (EHF) signals comprise 60 GHz signals.

3. The method according to claim 1, comprising configuring one or more polarization antenna arrays to perform said polarization isolation in said repeater device.

4. The method according to claim 1, comprising utilizing a Received Signal Strength Indicator (RSSI) to measure strength of said receive (Rx) signals to enable said signal gain control in said repeater device.

5. The method according to claim 1, comprising utilizing a Received Signal Strength Indicator (RSSI) to measure strength of said transmit (Tx) signals to enable said signal gain control in said repeater device.

6. The method according to claim 1, comprising coordinating said signal gain control in said repeater device utilizing said one or more control connections between said repeater device, and a source wireless device and/or target wireless device to enable said signal gain control in said repeater device.

7. The method according to claim 6, wherein said one or more control connections comprise non-extremely high frequency (non-EHF) connections.

8. The method according to claim 7, wherein said non-EHF connections comprise Bluetooth (BT) connections and/or ultra-wideband (UWB) connections.

9. The method according to claim 6, wherein said coordinating comprises enabling said repeater device to negotiate, via said one or more control connections, with said source wireless device and/or said target wireless device to set a strength of said receive (Rx) and/or transmit (Tx) signals to enable said signal gain control in said repeater device.

10. A machine-readable storage having stored thereon, a computer program having at least one code section for wireless communication, the at least one code section being executable by a machine for causing the machine to perform steps comprising:

mitigating via polarization isolation, signal interference between receive (Rx) and transmit (Tx) signals in a repeater device that extends a range of extremely high frequency (EHF) signals communicated between a plurality of wireless devices, wherein said repeater device is operable to manage EHF forwarding via one or more control connections, and at least one of said one or more control connections is established utilizing a second interface that is separate from a first interface utilized for communicating said EHF signals between said plurality of wireless devices; and maximizing a strength of said transmit (Tx) signals via signal gain control in said repeater device.

11. The machine-readable storage according to claim 10, wherein said extremely high frequency (EHF) signals comprise 60 GHz signals.

12. The machine-readable storage according to claim 10, wherein said at least one code section comprises code for configuring one or more polarization antenna arrays to perform said polarization isolation in said repeater device.

13. The machine-readable storage according to claim 10, wherein said at least one code section comprises code for utilizing a Received Signal Strength Indicator (RSSI) to measure strength of said receive (Rx) signals to enable said signal gain control in said repeater device.

14. The machine-readable storage according to claim 10, wherein said at least one code section comprises code for utilizing a Received Signal Strength Indicator (RSSI) to measure strength of said transmit (Tx) signals to enable said signal gain control in said repeater device.

15. The machine-readable storage according to claim 10, wherein said at least one code section comprises code for coordinating said signal gain control in said repeater device utilizing said one or more control connections between said repeater device, and a source wireless device and/or target wireless device to enable said signal gain control in said repeater device.

16. The machine-readable storage according to claim 15, wherein said coordinating comprises enabling said repeater device to negotiate, via said one or more control connections, with said source wireless device and/or said target wireless device to set a strength of said receive (Rx) and/or transmit (Tx) signals to enable said signal gain control in said repeater device.

17. A system for wireless communication, the system comprising:

one or more processors that enable mitigation, via polarization isolation, of signal interference between receive (Rx) and transmit (Tx) signals in a repeater device that extends a range of extremely high frequency (EHF) signals communicated between a plurality of wireless devices, wherein said repeater device is operable to manage EHF forwarding via one or more control connections, and at least one of said one or more control connections is established utilizing a second interface that is separate from a first interface utilized for communicating said EHF signals between said plurality of wireless devices; and said one or more processors enable maximization of a strength of said transmit (Tx) signals via signal gain control in said repeater device.

18. The system according to claim 17, wherein said extremely high frequency signals comprises 60 GHz signals.

19. The system according to claim 17, wherein said one or more processors enable configuration of one or more polarization antenna arrays to perform said polarization isolation in said repeater device.

20. The system according to claim 17, wherein said one or more processors enable utilization of a Received Signal Strength Indicator (RSSI) to measure strength of said receive (Rx) signals to enable said signal gain control in said repeater device.

21. The system according to claim 17, wherein said one or more processors enable utilization of a Received Signal Strength Indicator (RSSI) to measure strength of said transmit (Tx) signals to enable said signal gain control in said repeater device.

22. The system according to claim 17, wherein said one or more processors enable coordination of said signal gain control in said repeater device utilizing said one or more control connections between said repeater device, and a source wireless device and/or target wireless device to enable said signal gain control in said repeater device.

23. The system according to claim 22, wherein said one or more control connections comprise non-extremely high frequency (non-EHF) connections.

24. The system according to claim 23, wherein said non-EHF connections comprise Bluetooth (BT) connections and/or ultra-wideband (UWB) connections.

25. The system according to claim 22, wherein said coordination comprises enabling said repeater device to negotiate, via said one or more control connections, with said source wireless device and/or said target wireless device to set a strength of said receive (Rx) and/or transmit (Tx) signals to enable said signal gain control in said repeater device.

* * * * *